US010085314B1

(12) United States Patent
Milanesi et al.

(10) Patent No.: US 10,085,314 B1
(45) Date of Patent: Sep. 25, 2018

(54) LIGHT EMITTING DIODE DRIVER FOR LOAD CHANGES

(71) Applicant: Infineon Technologies AG, Neubiberg (DE)

(72) Inventors: Paolo Milanesi, Padua (IT); Fabio Fragiacomo, Montegrotto Terme (IT); Maurizio Galvano, Padua (IT); Roberto Penzo, Vigonza (IT); Enrico Tonazzo, Villanova di Camposampiero (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/921,406

(22) Filed: Mar. 14, 2018

(51) Int. Cl.
*H05B 33/08* (2006.01)
*H05B 37/02* (2006.01)

(52) U.S. Cl.
CPC ....... *H05B 33/0815* (2013.01); *H05B 33/089* (2013.01); *H05B 33/0845* (2013.01); *H05B 37/0281* (2013.01)

(58) Field of Classification Search
CPC ............ H05B 33/0815; H05B 33/0809; H05B 33/0896; H05B 33/083; H05B 33/0842; H05B 33/0845; H05B 37/02; H05B 37/029; H02M 3/1582; H02M 3/158; H02M 2001/0003; H02M 2001/0009; H02M 2001/0025; H02M 2001/0019; B60Q 1/04; B60Q 1/1423; B60Q 1/1446; Y02B 20/347
See application file for complete search history.

(56) References Cited

U.S. PATENT DOCUMENTS

| | | | | |
|---|---|---|---|---|
| 9,203,311 | B2 | 12/2015 | Penzo et al. | |
| 9,301,359 | B2 * | 3/2016 | Wray | H05B 33/0818 |
| 9,485,818 | B2 * | 11/2016 | Galvano | H05B 33/0815 |
| 9,763,296 | B1 | 9/2017 | Milanesi et al. | |
| 9,820,343 | B1 * | 11/2017 | Fragiacomo | B60Q 1/04 |
| 9,955,551 | B2 * | 4/2018 | Spero | F21S 41/143 |
| 2016/0227616 | A1 * | 8/2016 | Lee | H05B 33/0815 |
| 2017/0238384 | A1 * | 8/2017 | Kawase | H05B 33/0842 315/82 |

OTHER PUBLICATIONS

U.S. Appl. No. 15/458,450, filed Mar. 14, 2017, naming inventors Paolo Milanesi et al.

* cited by examiner

*Primary Examiner* — Haissa Philogene
(74) *Attorney, Agent, or Firm* — Shumaker & Sieffert, P.A.

(57) ABSTRACT

A device for regulating a voltage includes a first branch switch, a second branch switch, and a control module. The control module is configured to determine an instruction to change from a first state to a second state. In response to the instruction, the control module is configured to activate the second branch switch, drive a power module to increase a supply voltage to provide a supply power for activating a second set of LEDs, drive the first branch switch to dissipate a portion of the supply power to provide a target power for activating a first set of LEDs in response to determining that a current at the second branch switch does not exceed a current threshold, and deactivate the first branch switch in response to determining that the current at the second branch switch exceeds the current threshold.

20 Claims, 10 Drawing Sheets

100
CONTROL MODULE 114
POWER MODULE 102
$P_{SUPPLY}$
112
FIRST BRANCH SWITCH 108
$P_{target1}$
FIRST SET OF LEDS 104
SECOND BRANCH SWITCH 110
$P_{target2}$
SECOND SET OF LEDS 106

DETERMINE AN INSTRUCTION TO CHANGE FROM A FIRST STATE TO A SECOND STATE — 1102
ACTIVATE A SECOND BRANCH SWITCH — 1104
DRIVE A POWER MODULE TO INCREASE A SUPPLY VOLTAGE TO PROVIDE A SUPPLY POWER FOR ACTIVATING A SECOND SET OF LEDS — 1106
DRIVE THE FIRST BRANCH SWITCH TO DISSIPATE A PORTION OF THE SUPPLY POWER TO PROVIDE A TARGET POWER FOR ACTIVATING A FIRST SET OF LEDS — 1108
DEACTIVATE THE FIRST BRANCH SWITCH IN RESPONSE TO DETERMINING THAT A CURRENT AT THE SECOND BRANCH SWITCH EXCEEDS A CURRENT THRESHOLD — 1110
DETERMINE A TIME DELAY CORRESPONDING TO A DIFFERENCE BETWEEN ACTIVATING THE SECOND BRANCH SWITCH AND DEACTIVATING THE FIRST BRANCH SWITCH — 1112
RECEIVE AN INSTRUCTION TO CHANGE FROM THE SECOND STATE TO THE FIRST STATE — 1114
CHANGE FROM THE SECOND STATE TO THE FIRST STATE AFTER THE TIME DELAY — 1116

LIGHT EMITTING DIODE DRIVER FOR LOAD CHANGES

TECHNICAL FIELD

This disclosure relates a driver, such as a light emitting diode driver, that is configured to control a voltage, current, or power supplied to a load, such as a string of light emitting diodes.

BACKGROUND

Drivers may control a voltage, current, or power at a load. For instance, a light emitting diode (LED) driver may control a power supplied to a string of light emitting diodes. Some drivers may include a DC to DC converter, such as a buck-boost, buck, boost, or another DC to DC converter. Such DC to DC converters may be required to change the power at the load based on a characteristic of the load. For instance, when operating front lighting of an automobile in a high beam setting, the string of light emitting diodes may require a higher power than when operating in a low beam setting.

SUMMARY

In general, this disclosure is directed to techniques for reducing a current overshoot and undershoot in a set of light emitting diodes (LEDs). For example, in an exemplary automotive application, a LED driver may change from activating a first string of LEDs for day light running lighting to a second string of LEDs for high beam lighting that is longer than the first string of LEDs. To account for the change of LEDs, a power module may increases a voltage output to power the second string of LEDs for high beam lighting. However, the second string of LEDs for high beam lighting may not necessarily activate until the power module sufficiently increases the voltage, resulting in a lack of output current. Rather than immediately deactivating the first string of LEDs for day light running lighting, techniques described herein deactivate the first string of LEDs for day light running lighting after the second string of LEDs for day high beam lighting have been activated. Moreover, techniques herein may dissipate a power output during the power module voltage increase, while keeping constant the power on the string of LEDs for day light running lighting to prevent damage to LEDs. In this way, techniques described herein may help to reduce the lack of output current and may help to accurately provide a target duty cycle.

In an example, a system includes a method for regulating a current or power. The method includes determining an instruction to change from a first state to a second state. During the first state, a first branch switch is activated to provide power to a first set of LEDs and a second branch switch is deactivated to refrain from providing power to a second set of LEDs. During the second state, the first branch switch is deactivated to refrain from providing power to the first set of LEDs and the second branch switch is activated to provide power to the second set of LEDs. The method further includes, in response to the instruction to change from the first state to the second state, activating the second branch switch, driving a power module to increase a supply voltage to provide a supply power for activating the second set of LEDs, driving the first branch switch to dissipate a portion of the supply power to provide a target power for activating the first set of LEDs in response to determining that a current at the second branch switch does not exceed a current threshold, and deactivating the first branch switch in response to determining that the current at the second branch switch exceeds the current threshold.

In another example, a device for regulating a current or power includes a first branch switch, a second branch switch, and a control module. The first branch switch is configured to selectively provide at least a portion of power output by a power module to a first set of LEDs. The second branch switch configured to selectively provide at least a portion of the power output by the power module to a second set of LEDs. The control module is configured to determine an instruction to change from a first state to a second state. During the first state, the first branch switch is activated to provide power to the first set of LEDs and the second branch switch is deactivated to refrain from providing power to the second set of LEDs. During the second state, the first branch switch is deactivated to refrain from providing power to the first set of LEDs and the second branch switch is activated to provide power to the second set of LEDs. In response to the instruction to change from the first state to the second state, the control module is configured to drive the power module to activate the second branch switch, increase a supply voltage to provide a supply power for activating the second set of LEDs, drive the first branch switch to dissipate a portion of the supply power to provide a target power for activating the first set of LEDs in response to determining that a current at the second branch switch does not exceed a current threshold, and deactivate the first branch switch in response to determining that the current at the second branch switch exceeds the current threshold.

In another example, a system includes a power module, a first set of LEDs, a second set of LEDs, a first branch switch, a second branch switch, and a control module. The power module is configured to output power. The first branch switch is configured to selectively provide at least a portion of the power output by the power module to the first set of LEDs. The second branch switch is configured to selectively provide at least a portion of the power output by the power module to the second set of LEDs. The control module is configured to determine an instruction to change from a first state to a second state. During the first state, the first branch switch is activated to provide power to the first set of LEDs and the second branch switch is deactivated to refrain from providing power to the second set of LEDs. During the second state, the first branch switch is deactivated to refrain from providing power to the first set of LEDs and the second branch switch is activated to provide power to the second set of LEDs. In response to the instruction to change from the first state to the second state, the control module is configured to drive the power module to activate the second branch switch, increase a supply voltage to provide a supply power for activating the second set of LEDs, drive the first branch switch to dissipate a portion of the supply power to provide a target power for activating the first set of LEDs when a current at the second branch switch does not exceed a current threshold, and deactivate the first branch switch when the current at the second branch switch exceeds the current threshold.

Details of these and other examples are set forth in the accompanying drawings and the description below. Other features, objects, and advantages will be apparent from the description and drawings, and from the claims.

DETAILED DESCRIPTION

For a multifunction system to jump from a lower number of light emitting diodes (LEDs) to higher number of LEDs, a rapid increase in voltage may be necessary to activate the higher number of LEDs. However, many systems need time to increase an output voltage to activate the larger number of LEDs. As such, some systems may create a lack of output current due to a time needed to increase the output voltage. This lack of output current may cause a gap between an imposed duty cycle of the logical pulse width modulation (PWM) dimming signal and the effective duty cycle of the output current, which results in an inaccuracy of the average current of each function.

To compensate a pulse width modulation dimming current inaccuracy in cost optimized systems, some systems may use a constant monitor of the output current (to measure the gap between a target average current and a realized output current) and a microcontroller that provides to a LED Driver controller a higher duty cycle signal in order to compensate the gap between a target average current and a realized output current. Such systems may necessarily, constantly monitor an output current and a voltage, use a microcontroller to manage control of the LED Driver, and use complicated software to manage the acquisition and the elaboration of the data needed to properly set the duty cycle. Moreover, such systems may not provide current when switching from a smaller set of LEDs (e.g., fewer LEDs, smaller LEDs, etc.) to a larger set of LEDs, which may limit a maximum duty cycle manageable by the system.

Rather than relying on a microcontroller or microprocessor to compensate a pulse width modulation dimming current inaccuracy, some systems may include branch switches configured to independently bypass a respective set of LEDs and to independently dissipate power in excess of a target power for operating a respective set of LEDs. For example, a first branch switch may operate to increase a resistance of the first branch switch such that power in excess of a target power for operating a first set of LEDs is dissipated at the first branch switch. As such, branch switches may help to mitigate the lack of output current of other systems by, for example, effectively introducing a delay in deactivating a set of LEDs. Moreover, a control module may be configured to delay a turn-off of a PWM dimming signal to reduce or eliminate a gap between an imposed duty cycle of the logical PWM) dimming signal and the effective duty cycle of the output current.

Figure 1:
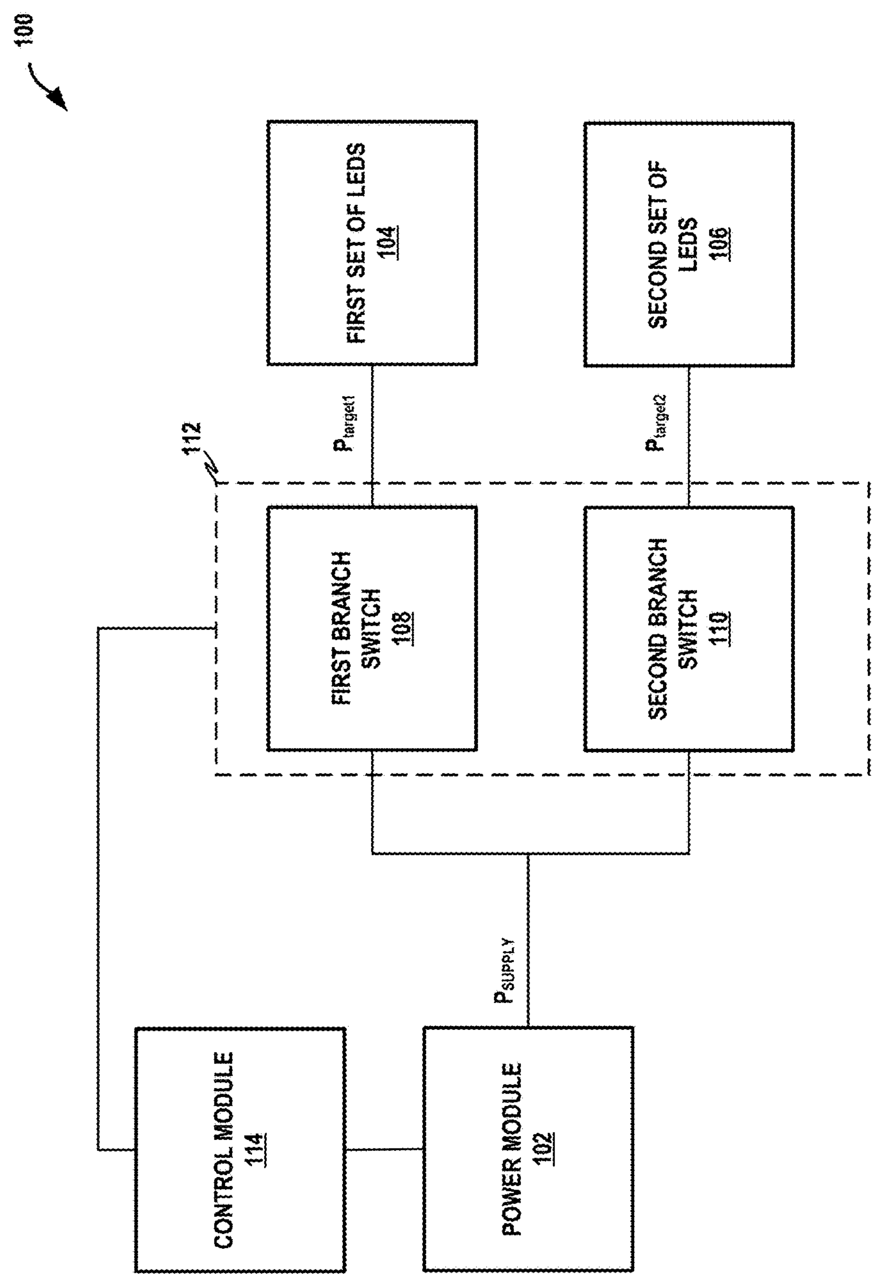
FIG. 1 is a block diagram illustrating an example system configured for mitigating a lack of output current when changing between a first set of light emitting diodes (LEDs) and a second set of LEDs, in accordance with one or more techniques of this disclosure.

FIG. 1 is a block diagram illustrating an example system 100 configured for mitigating a lack of output current when changing between a first set of LEDs 104 and a second set of LEDs 106, in accordance with one or more techniques of this disclosure. As illustrated in this example of FIG. 1, system 100 may include power module 102, first set of LEDs 104, second set of LEDs 106, first branch switch 108 and second branch switch 110 (collectively, series module 112), and control module 114. Although system 100 illustrates two sets of LEDs (e.g., first set of LEDs 104 and second set of LEDs 106), some examples may include more than two sets of LEDs.

Power module 102 may be configured to output a supply power to series module 112. In some examples, power module 102 may be or include a DC to DC power converter. In some examples, power module 102 may be configured to generate the supply power based on an indication of a target power. For instance, power module 102 may be configured to generate the supply power based on a target power output by control module 114. Power module 102 may include one or more switch-mode power converters including, but are not limited to, flyback, buck-boost, buck, auk, or the like. Power module 102 may include one or more switching elements to switch in and out one or more energy storage components (e.g., inductor, capacitor, or another energy storage component).

First set of LEDs 104 may include any number of LEDs. In some examples, two or more LEDs of first set of LEDs 104 may be coupled in series. Additionally, or alternatively, two or more LEDs of first set of LEDs 104 may be coupled in parallel. Similarly, second set of LEDs 106 may include any number of LEDs. In some examples, two or more LEDs of second set of LEDs 106 may be coupled in series. Additionally, or alternatively, two or more LEDs of second set of LEDs 106 may be coupled in parallel.

In the example of FIG. 1, second set of LEDs 106 is associated with a higher voltage to activate second set of LEDs 106 than a voltage to activate first set of LEDs 104. For instance, second set of LEDs 106 may include a higher quantity of LEDs than first set of LEDs 104. Additionally, or alternatively, second set of LEDs 106 may include a one or more LEDs having a higher forward voltage than LEDs of first set of LEDs 104. In some examples, second set of LEDs 106 may have a higher forward voltage than first set of LEDs 104. Although FIG. 1 illustrates two branches, 'n' number of branches may be used, where 'n' is any integer value greater than 1. For example, some examples may include three branches that are each coupled to a respective set of LEDs.

As used herein, a LED may refer to any semiconductor light source. In some examples, an LED may include a p-n junction configured to emit light when activated. In an exemplary application, first set of LEDs 104 and/or second set of LEDs 106 may be included in a headlight assembly for automotive applications. For instance, first set of LEDs 104 and/or second set of LEDs 106 may be a matrix of LEDs to light the road ahead of an automotive vehicle. In some examples, first set of LEDs 104 and/or second set of LEDs 106 may be associated with one or more beam settings. For example, first set of LEDs 104 may be configured to provide a low beam and/or high beam. In some examples, second set of LEDs 106 may be configured to provide daytime running lights.

First branch switch 108 may include any device suitable to block current to first set of LEDs 104 and to dissipate power output by power module 102 for output to first set of LEDs 104. In some examples, first branch switch 108 may include a switching element. Examples of a switching element may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that a switching element may be a high side switch or low side switch. Additionally, a switching element may be voltage-controlled and/or current-controlled. Examples of current-controlled switching elements may include, but are not limited to, gallium nitride (GaN) MOSFETs, BJTs, or other current-controlled elements.

First branch switch 108 may be activated such that power ("$P_{supply}$") output from power module 102 flows through first branch switch 108 to first set of LEDs 104. In some examples, first branch switch 108 may be activated to dissipate a portion of the power ("$P_{supply}$") output from power module 102 and output a target power ("$P_{target1}$") to first set of LEDs 104. For instance, a resistance of first branch switch 108 may be modified to dissipate the portion of the power ("$P_{supply}$") output from power module 102 such that a resulting power output to first set of LEDs 104 corresponds to target power ("$P_{target1}$").

Similarly, second branch switch 110 may include any device suitable to block current to second set of LEDs 106 and to dissipate power output by power module 102 for output to second set of LEDs 106. In some examples, second branch switch 110 may include a switching element.

Second branch switch 110 may be activated such that power ("$P_{supply}$") output from power module 102 flows through second branch switch 110 to second set of LEDs 106. In some examples, second branch switch 110 may be activated to dissipate a portion of the power ("$P_{supply}$") output from power module 102 and output a target power ("$P_{target2}$") to second set of LEDs 106. For instance, a resistance of second branch switch 110 may be modified to dissipate the portion of the power ("$P_{supply}$") output from power module 102 such that a resulting power output to second set of LEDs 106 corresponds to target power ("$P_{target2}$").

Control module 114 may be configured to control power module 102. For example, in response to receiving an instruction to activate first set of LEDs 104 and deactivate second set of LEDs 106, control module 114 may drive power module 102 to output a target voltage, target current, and/or target power corresponding to first set of LEDs 104. Similarly, in response to receiving an instruction to deactivate first set of LEDs 104 and activate second set of LEDs 106, control module 114 may drive power module 102 to output a target voltage, target current, and/or target power corresponding to second set of LEDs 106.

Control module 114 may be configured to control first branch switch 108. For example, control module 114 may drive a voltage at a control node (e.g. gate) of a switching element of first branch switch 108 to activate first branch switch 108 to permit power to flow from power module 102 to first set of LEDs 104. Control module 114 may drive a voltage at a control node (e.g. gate) of a switching element of first branch switch 108 to deactivate first branch switch 108 to prevent power to flow from power module 102 to first set of LEDs 104. In some examples, control module 114 may drive a voltage at a control node (e.g. gate) of a switching element of first branch switch 108 to dissipate a portion of power output by power module 102 and permit a remaining portion ("$P_{target1}$") of the power output by power module 102 to flow from power module 102 to first set of LEDs 104.

Control module 114 may be configured to control second branch switch 110. For example, control module 114 may drive a voltage at a control node (e.g. gate) of a switching element of second branch switch 110 to activate second branch switch 110 to permit power to flow from power module 102 to second set of LEDs 106. Control module 114 may drive a voltage at a control node (e.g. gate) of a switching element of second branch switch 110 to deactivate second branch switch 110 to prevent power to flow from power module 102 to second set of LEDs 106. In some examples, control module 114 may drive a voltage at a control node (e.g. gate) of a switching element of second branch switch 110 to dissipate a portion of power output by power module 102 and permit a remaining portion ("$P_{target2}$") of the power output by power module 102 to flow from power module 102 to second set of LEDs 106.

In accordance with one or more techniques described herein, rather than outputting no power or no current from power module 102 to first set of LEDs 104 and second set of LEDs 106 while a voltage output from power module 102 increases to a threshold voltage value (e.g., forward voltage) for activating second set of LEDs 106, control module 114 may delay deactivating first branch switch 108 until a current at second branch switch 110 exceeds a current threshold.

For example, control module 114 may receive an instruction to change from a first state to a second state. During the first state, first branch switch 108 is activated to provide power to first set of LEDs 104 and second branch switch 110 is deactivated to refrain from providing power to second set of LEDs 106. During the second state, first branch switch 108 is deactivated to refrain from providing power to first set of LEDs 104 and second branch switch 110 is activated to provide power to second set of LEDs 106.

In response to receiving the instruction to change from the first state to the second state, control module 114 may activate second branch switch 110. For example, control module 114 activate second branch switch 110 to permit power to flow from power module 102 to second set of LEDs 106.

In response to receiving the instruction to change from the first state to the second state, control module 114 may be configured to drive power module 102 to increase a supply voltage to provide a supply power for activating second set of LEDs 106. For example, control module 114 may increase a reference signal output to power module 102 based on an increase in a quantity of LEDs to be activated in second set of LEDs 106 compared to a quantity of LEDs activated in first set of LEDs 104. In some examples, control module 114 may decrease (e.g., single sensing) a reference signal output to power module 102 based on an increase in a quantity of LEDs to be activated in second set of LEDs 106 compared to a quantity of LEDs activated in first set of LEDs 104. In some examples, control module 114 may maintain (e.g., double sensing) a reference signal output to power module 102 based on an increase in a quantity of LEDs to be activated in second set of LEDs 106 compared to a quantity of LEDs activated in first set of LEDs 104.

In response to receiving the instruction to change from the first state to the second state, control module 114 may drive first branch switch 108 to dissipate a portion of the supply power to provide a target power for activating first set of LEDs 104 in response to determining that a current at second branch switch 110 does not exceed a current threshold. For example, control module 114 may drive a voltage at a control node (e.g. gate) of a switching element of first branch switch 108 to dissipate a portion of power output by power module 102 and permit a remaining portion ("Ptargeti") of the power output by power module 102 to flow from power module 102 to first set of LEDs 104.

In response to receiving the instruction to change from the first state to the second state, control module 114 may deactivates first branch switch 108 in response to determining that the current at second branch switch 110 exceeds the current threshold. For example, control module 114 deactivate first branch switch 108 to prevent power to flow from power module 102 to first set of LEDs 104. In this way, branch switches 108 and 110 may help to mitigate the lack of output current by, for example, effectively introducing a delay in deactivating first set of LEDs 104.

Figure 2:
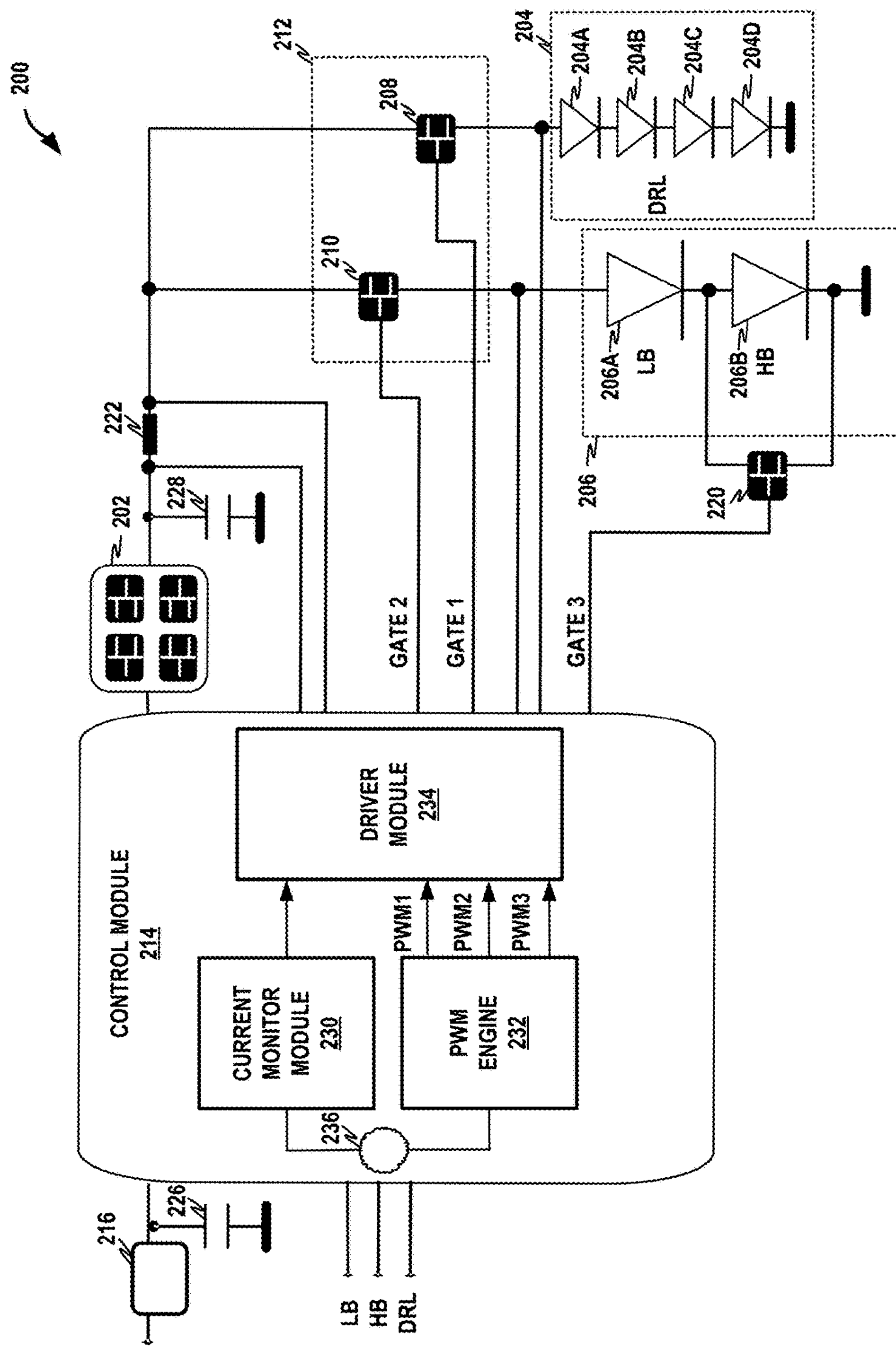
FIG. 2 is a conceptual diagram illustrating a first example circuit configured for mitigating a lack of output current when changing between a first set of LEDs and a second set of LEDs, in accordance with one or more techniques of this disclosure.

FIG. 2 is a conceptual diagram illustrating a first example circuit 200 configured mitigating a lack of output current when changing between a first set of LEDs 204 and a second set of LEDs 206, in accordance with one or more techniques of this disclosure. As illustrated, circuit 200 includes power module 202, first set of LEDs 204, second set of LEDs 206, first branch switch 208 and second branch switch 210 (collectively, series module 212), control module 214, power source 216, bypass switch 220, sensing element 222, and capacitors 226 and 228. Control module 214 may be an example of control module 114 of FIG. 1.

In some examples, sensing element 222 may include a resistive element. As shown, sensing element 222 is coupled in series with first branch switch 208. Moreover, sensing element 222 is coupled in series with second branch switch 210. In the example of FIG. 2, there are two functions (e.g., activating first set of LEDs 204 and activating second set of LEDs 206) with different quantities of LEDs number. For instance, as indicated by the larger sized LEDs of second set of LEDs 206 compared to first set of LEDs 204, second set of LEDs 206 uses a higher power than first set of LEDs 204. In other examples, second set of LEDs 206 may use a lower power than first set of LEDs 204.

Control module 114 includes logic module 236, current monitor module 230, PWM engine 232, and driver module 234. Current monitor module 230 may determine a current at first branch switch 208 and/or second branch switch 210. For example, current monitor module 230 may determine a voltage at sensing element 222. In this example, current monitor module 230 may determine a current flowing from power module 202 based on the voltage at sensing element 222. In instances where first branch switch 208 is deactivated and second branch switch 210 is activated, current monitor module 230 may estimate the current at second branch switch 210 as proportional to the voltage at sensing element 222. Similarly, in instances where first branch switch 208 is activated and second branch switch 210 is deactivated, current monitor module 230 may estimate the current at first branch switch 208 as proportional to the voltage at sensing element 222. Further, in instances where first branch switch 208 is activated and second branch switch 210 is activated, current monitor module 230 may estimate the current at first branch switch 208 and second branch switch 210 as proportional to the voltage at sensing element 222. In some examples, current monitor module 230 may output an indication that current at first branch switch 208 is under or above a threshold for first branch switch 208. In some examples, current monitor module 230 may output an indication that current at second branch switch 210 is under or above a threshold for second branch switch 210. In some examples, current monitor module 230 may output an indication that current at first branch switch 208 and second branch switch 210 is under or above a threshold for first branch switch 208 and second branch switch 210.

Logic module 236 may be configured to determine a target quantity number of LEDs of first set of LEDs 204 and second set of LEDs 206 to be activated. Logic module 236 may receive (e.g., from a user interaction with circuit 200) an indication to change a beam setting of circuit 200 from a high beam setting to a low beam setting. For instance, logic module 236 may receive an indication of a quantity of LEDs to activate and output an indication of a target power based on the quantity of LEDs. For example, in response to receiving, from a hardware user interface, a low voltage (e.g., logical 0) at a low beam (LB) input, a low voltage (e.g., logical 0) at a high beam (HB) input, and a high voltage (e.g., logical 1) at a daytime running lights (DRL) input, logic module 236 may output an indication of a target power corresponding to a power to activate LEDs 204A-204D of first set of LEDs 204. In response, however, to receiving, from a hardware user interface, a high voltage (e.g., logical 1) at a low beam (LB) input, a high voltage (e.g., logical 1) at a high beam (HB) input, and a low voltage (e.g., logical 0) at a daytime running lights (DRL) input, logic module 236 may output an indication of a target power corresponding to a power to activate LEDs 206A-206B of second set of LEDs 206.

Additionally, or alternatively, logic module 236 may determine to change a beam setting of circuit 200 from a high beam setting to a low beam setting in response to sensor data indicating an oncoming automobile. In any case, in response to determining a beam setting of circuit 200, logic module 236 may determine a quantity number of load units corresponding to the beam setting. For instance, logic module 236 may determine that the target quantity number of LEDs is one when the low beam setting is associated with only LED 206A and logic module 236 may determine that the target quantity number of LEDs is two when the high beam setting is associated with LEDs 206B. In some examples, logic module 236 may include an analog circuit. In some examples, logic module 236 may be a digital circuit comprising one or more logic elements and/or timing elements.

Logic module 236 may be configured to generate a reference signal (e.g., compensation voltage) indicating a target power based on a target quantity number of LEDs. For example, logic module 236 may generate a reference signal based on a target quantity number of LEDs to be activated. For instance, logic module 236 may increase the reference signal as the quantity number of LEDs increases and decrease the reference signal as the quantity number of LEDs decreases.

Additionally, or alternatively, logic module 236 may generate a reference signal based on a power consumption, forward voltage, and/or average current of LEDs to be activated. For instance, logic module 236 may increase the reference signal when switching to LEDs that have a higher power consumption, forward voltage, and/or average current of LEDs compared to previously activated LEDs and may decrease the reference signal when switching to LEDs that have a lower power consumption, forward voltage, and/or average current of LEDs compared to previously activated LEDs.

Logic module 236 may generate a first command PWM signal to activate first set of LEDs 204. For example, logic module 236 may determine a duty cycle for first command PWM signal based on a target power. For instance, logic module 236 may perform a dimming function by reducing a duty cycle of first command PWM signal to reduce a brightness of first set of LEDs 204. Similar, logic module 236 may perform a brightening function by increasing a duty cycle of first command PWM signal to increase a brightness of first set of LEDs 204. In any case, logic module 236 may output first command PWM signal to PWM engine 232.

Similarly, logic module 236 may generate a second command PWM signal to activate second set of LEDs 206. For example, logic module 236 may determine a duty cycle for second command PWM signal based on a target power. For instance, logic module 236 may perform a dimming function by reducing a duty cycle of second command PWM signal to reduce a brightness of second set of LEDs 206. Similar, logic module 236 may perform a brightening function by increasing a duty cycle of second command PWM signal to increase a brightness of second set of LEDs 206. In any case, logic module 236 may output second command PWM signal to PWM engine 232.

In some examples, logic module 236 may optionally generate a third command PWM signal to activate LED 206B of first set of LEDs 204. For example, logic module 236 may determine a duty cycle for the third command PWM signal based on a target power. For instance, logic module 236 may perform a dimming function by reducing a duty cycle of third command PWM signal to reduce a brightness of LED 206B. Similar, logic module 236 may perform a brightening function by increasing a duty cycle of third command PWM signal to increase a brightness of LED 206B. In any case, logic module 236 may output third command PWM signal to PWM engine 232.

PWM engine 232 may generate a first PWM signal ("PWM1") based on the first command PWM signal output by logic module 236. For example, PWM engine 232 may generate first PWM signal to compensate for undervoltage at power module 202. As discussed further below, PWM engine 232 may generate first PWM signal to have an effective duty cycle that corresponds to (e.g., equal, matches, etc.) a duty cycle of the first command PWM signal output by logic module 236.

Similarly, PWM engine 232 may generate a second PWM signal ("PWM2") based on the second command PWM signal output by logic module 236. For example, PWM engine 232 may generate second PWM signal to compensate for undervoltage at power module 202. As discussed further below, PWM engine 232 may generate second PWM signal to have an effective duty cycle that corresponds to (e.g., equal, matches, etc.) a duty cycle of the second command PWM signal output by logic module 236.

In some examples, PWM engine 232 may optionally generate a third PWM signal ("PWM3") based on the third command PWM signal output by logic module 236. For example, PWM engine 232 may generate the third PWM signal to compensate for undervoltage at power module 202. As discussed further below, PWM engine 232 may generate the third PWM signal to have an effective duty cycle that corresponds to (e.g., equal, matches, etc.) a duty cycle of the third command PWM signal output by logic module 236.

Driver module 234 may generate driving signals to activate first branch switch 208 based on the first PWM signal. For example, driver module 234 may output a driving signal to a control node (e.g., gate) of first branch switch 208 to activate first branch switch 208 during a rising edge of the first PWM signal. Driver module 234 may output a driving signal to a control node (e.g., gate) of first branch switch 208 to deactivate first branch switch 208 during a falling edge of the first PWM signal.

Similarly, driver module 234 may generate driving signals to activate second branch switch 210 based on the second PWM signal. For example, driver module 234 may output a driving signal to a control node (e.g., gate) of second branch switch 210 to activate second branch switch 210 during a rising edge of the second PWM signal. Driver module 234 may output a driving signal to a control node (e.g., gate) of second branch switch 210 to deactivate second branch switch 210 during a falling edge of the second PWM signal.

Driver module 234 may generate driving signals to activate bypass switch 220 based on the third PWM signal. For example, driver module 234 may output a driving signal to a control node (e.g., gate) of bypass switch 220 to activate bypass switch 220 during a rising edge of the third PWM signal. Driver module 234 may output a driving signal to a control node (e.g., gate) of bypass switch 220 to deactivate bypass switch 220 during a falling edge of the third PWM signal.

Driver module 234 may output a driving signal to a control node (e.g., gate) of first branch switch 208 to dissipate a portion of power output by power module 202 at first branch switch 208 after a rising edge of the first PWM signal and before a subsequent falling edge of the first PWM signal. In some examples, driver module 234 may drive first branch switch 208 to dissipate a portion of a supply power from power module 202 to provide a target power for activating first set of LEDs 204 based on a current threshold. For example, driver module 234 may be configured to drive first branch switch 208 to limit a maximum power at first set of LEDs 204. For example, driver module 234 may drive a switching element of first branch switch 208 to increase a resistance at first branch switch 208 when a power at current at first set of LEDs 204 is greater than a current threshold. In some examples, driver module 234 may drive a switching element of first branch switch 208 to decrease a resistance at first branch switch 208 when a power at first set of LEDs 204 is less than a power threshold.

Driver module 234 may output a driving signal to a control node (e.g., gate) of second branch switch 210 to dissipate a portion of power output by power module 202 at second branch switch 210 after a rising edge of the second PWM signal and before a subsequent falling edge of the second PWM signal. In some examples, driver module 234 may drive second branch switch 210 to dissipate a portion of a supply power from power module 202 to provide a target power for activating second set of LEDs 206 based on a current threshold. For example, driver module 234 may be configured to second branch switch 210 to limit a maximum power at second set of LEDs 206. For example, driver module 234 may drive a switching element of second branch switch 210 to increase a resistance at second branch switch 210 when a power at current at second set of LEDs 206 is greater than a current threshold. In some examples, driver module 234 may drive a switching element of second branch switch 210 to decrease a resistance at second branch switch 210 when a power at second set of LEDs 206 is greater than a power threshold.

Figure 3:
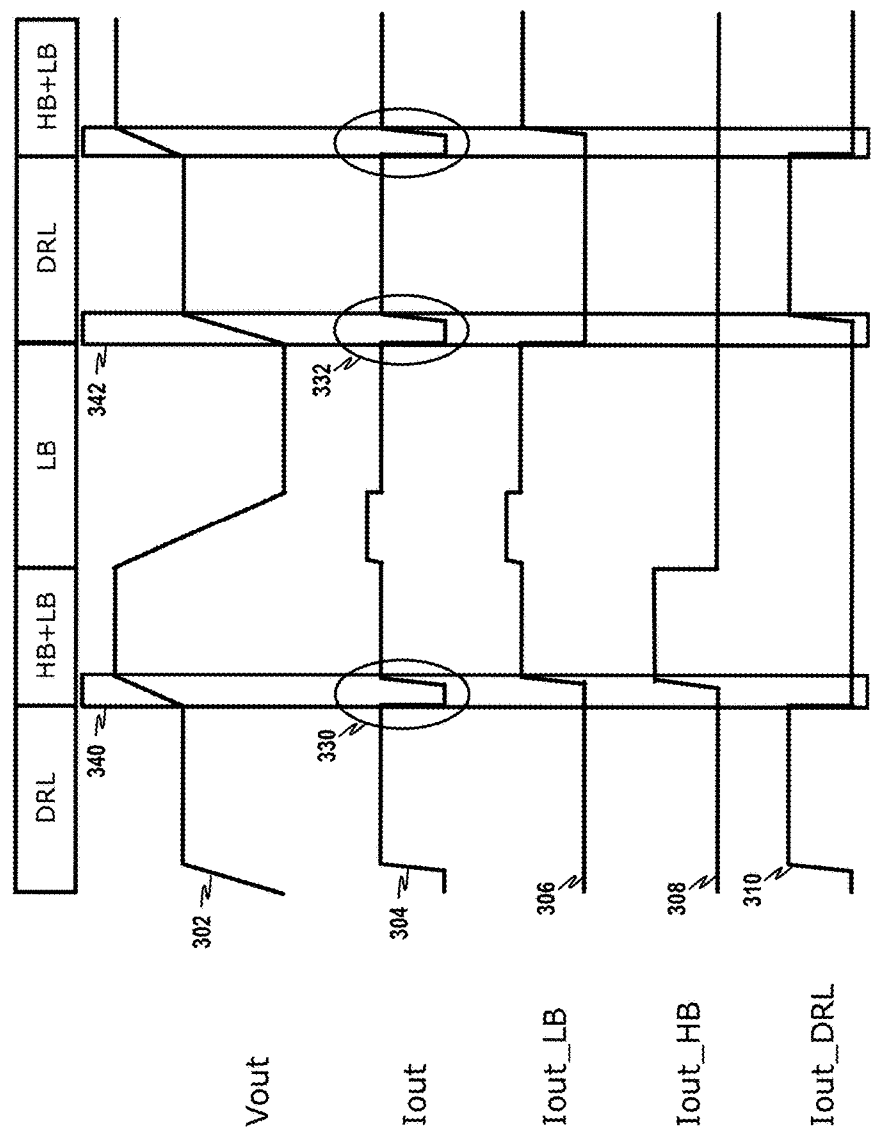
FIG. 3 is an illustration of a performance of a system that changes between a first set of LEDs and a second set of LEDs.

FIG. 3 is an illustration of a performance of a system that changes between a first set of LEDs and a second set of LEDs. For purposes of illustration only, FIG. 3 is described below within the context of system 100 of FIG. 1, circuit 200 of FIG. 2. The abscissa axis (e.g., horizontal) of FIG. 3 represents time and the ordinate axis (e.g., vertical) of FIG. 3 represents an output voltage 302 at power module 202, an output current 304 output by power module 202, an output current 306 at LED 206A, an output current 308 at LED 206B, and an output current 310 at first set of LEDs 204.

In the example of FIG. 3, at time 340, logic module 236 changes from activating first set of LEDs 204 (shown as "DRL") to operating second set of LEDs 206 (shown as "HB+LB"). However, at time 340, a voltage output by power module 202 is less than a forward voltage for activating second set of LEDs 206, which results in a lack of output current 330. Similarly, at time 342, a voltage output by power module 202 is less than a forward voltage for activating first set of LEDs 204, which results in a lack of output current 332.

Figure 4:
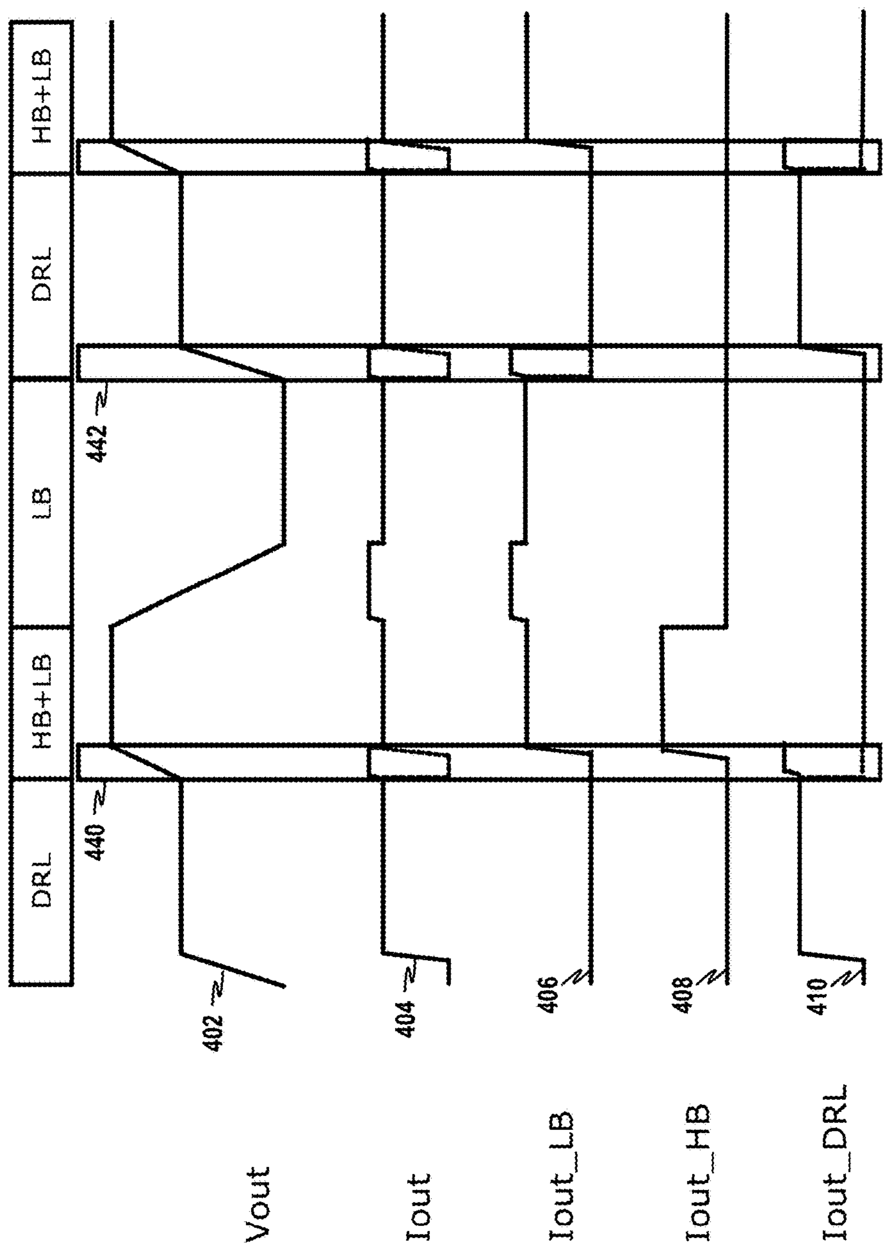
FIG. 4 is an illustration of a performance of a system that mitigates a lack of output current when changing between a first set of LEDs and a second set of LEDs, in accordance with one or more techniques of this disclosure.

FIG. 4 is an illustration of a performance of a system that mitigates a lack of output current when changing between a first set of LEDs and a second set of LEDs, in accordance with one or more techniques of this disclosure. For purposes of illustration only, FIG. 4 is described below within the context of system 100 of FIG. 1, circuit 200 of FIG. 2. The abscissa axis (e.g., horizontal) of FIG. 4 represents time and the ordinate axis (e.g., vertical) of FIG. 4 represents an output voltage 402 at power module 202, an output current 404 output by power module 202, an output current 406 at LED 206A, an output current 408 at LED 206B, and an output current 410 at first set of LEDs 204.

In the example of FIG. 4, at time 440, logic module 236 changes from activating first set of LEDs 204 (shown as "DRL") to operating second set of LEDs 206 (shown as "HB+LB"). However, rather than immediately deactivating first set of LEDs 204, PWM engine 232 generates a PWM signal to activate both first set of LEDs 204 and second set of LEDs 206. As shown, at time 440, a voltage output by power module 202 is less than a forward voltage for activating second set of LEDs 206, which results in no current at second set of LEDs 206. However, in the example of FIG. 4, at time 440, current is supplied to first set of LEDs 204 while power module 202 increases voltage, which helps to mitigate the lack of current illustrated in FIG. 3.

Moreover, as previously discussed, first branch switch 208 may dissipate a portion of the power supplied by power module 202 to limit a current and/or power supplied to first set of LEDs 204. Similarly, at time 442, current is supplied to LED 206A while power module 202 increases voltage.

Figure 5:
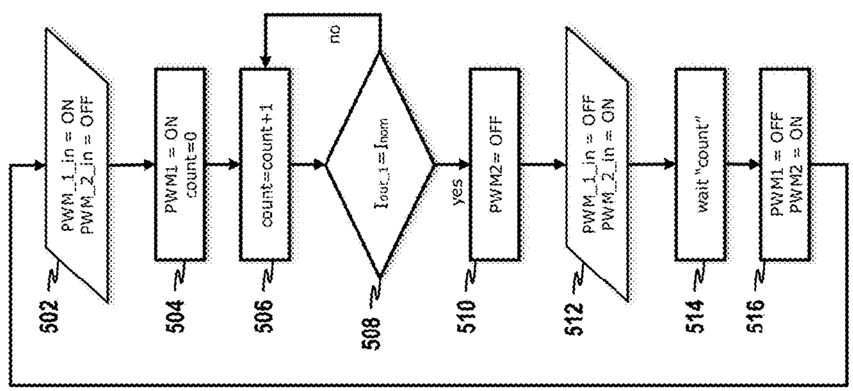
FIG. 5 is a flow diagram consistent with techniques that may be performed by the example system of FIG. 1, in accordance with this disclosure.

FIG. 5 is a flow diagram consistent with techniques that may be performed by the example system of FIG. 1, in accordance with this disclosure. For purposes of illustration only, FIG. 5 is described below within the context of system 100 of FIG. 1 and circuit 200 of FIG. 2. However, the techniques described below can be used in any permutation, and in any combination, with power module 102, first set of LEDs 104, second set of LEDs 106, first branch switch 108 and second branch switch 110 (collectively, series module 112), and control module 114. FIG. 5 is discussed with reference to FIG. 6.

Figure 6:
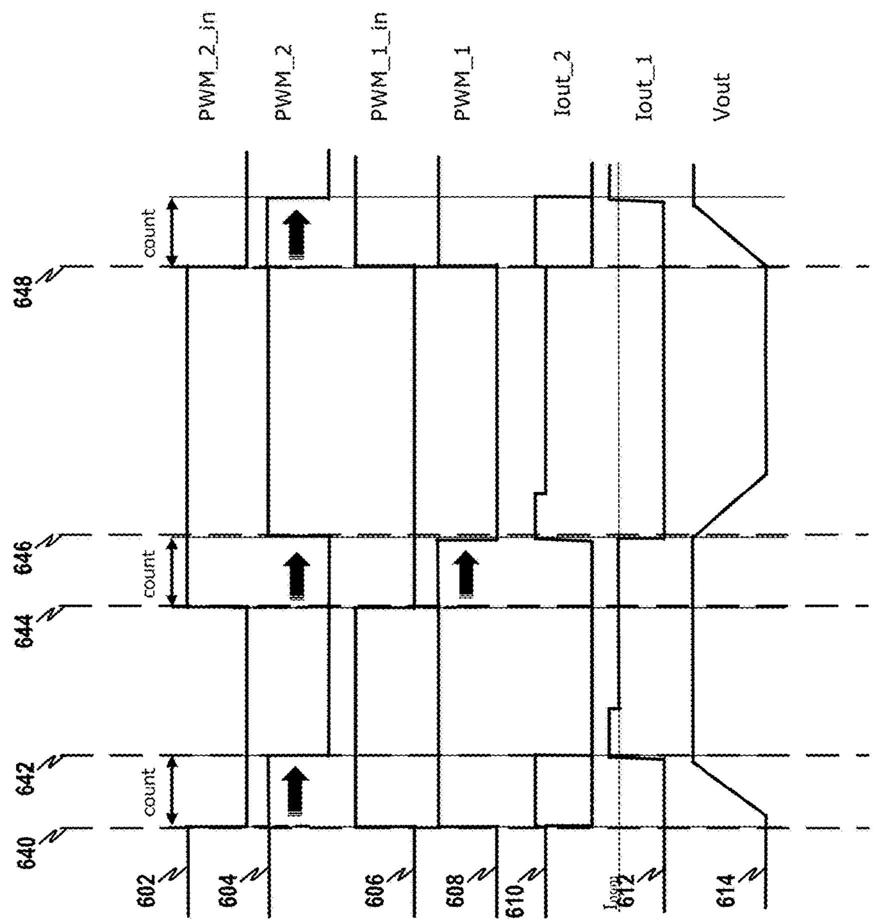
FIG. 6 is an illustration of a performance of a system implementing the techniques of FIG. 5, in accordance with one or more techniques of this disclosure.

FIG. 6 is an illustration of a performance of a system implementing the techniques of FIG. 5, in accordance with one or more techniques of this disclosure. The abscissa axis (e.g., horizontal) of FIG. 6 represents time and the ordinate axis (e.g., vertical) of FIG. 6 represents a second command PWM signal 602 output by logic module 236 for activating second branch switch 210, a second PWM signal 604 output by PWM engine 232 for activating second branch switch 210, a first command PWM signal 606 output by logic module 236 for activating first branch switch 208, a first PWM signal 608 output by PWM engine 232 for activating first branch switch 208, a current 610 at second branch switch 210, a current 612 at first branch switch 208, and an output voltage 614 at power module 202.

PWM engine 232 receives, at time 640, an instruction to change from a first state that deactivates first set of LEDs 204 and activates second set of LEDs 206 to a second state that activates first set of LEDs 204 and deactivates second set of LEDs 206 (502). For example, PWM engine 232 receives first command PWM signal 606 and second command PWM signal 602 from logic module 236. At time 640, PWM engine 232 activates first branch switch 208 and resets a count value to '0' (504). For example, PWM engine 232 generates first PWM signal 608 to have a rising edge at time 640. PWM engine 232 increments the count value (506).

Current monitor module 230 determines whether a current at first branch switch 208 exceeds a current threshold (508). In response to determining that the current at first branch switch 208 does not exceeds a current threshold ("no" of 508), PWM engine 232 increments (506), for each cycle that occurs after activating first branch switch 208 the count value.

In response, however, to determining that the current at first branch switch 208 exceeds the current threshold ("yes" of 508), PWM engine 232 deactivates second set of LEDs 206 (510) at time 642. For example, PWM engine 232 generates second PWM signal 604 to have a falling edge at time 642. In this example, PWM engine 232 may determine a time delay corresponding between activating first branch switch 208 and deactivating second branch switch 210 based on a count value that occurs when PWM engine 232 deactivates first branch switch 208.

At time 644, PWM engine 232 receives an instruction to change from the second state that activates first set of LEDs 204 and deactivates second set of LEDs 206 to the first state that deactivates first set of LEDs 204 and activates second set of LEDs 206 (512). In response to the instruction to change from the second state to the first state, PWM engine 232 refrains from changing from the second state to the first state until after the time delay (514). For example, PWM engine 232 refrains from changing from the second state to the first state until after the count value. At time 646, PWM engine 232 changes from the second state that activates first set of LEDs 204 and deactivates second set of LEDs 206 to the first state that deactivates first set of LEDs 204 and activates second set of LEDs 206 (516) and the process repeats to 502 at time 648.

Figure 7:
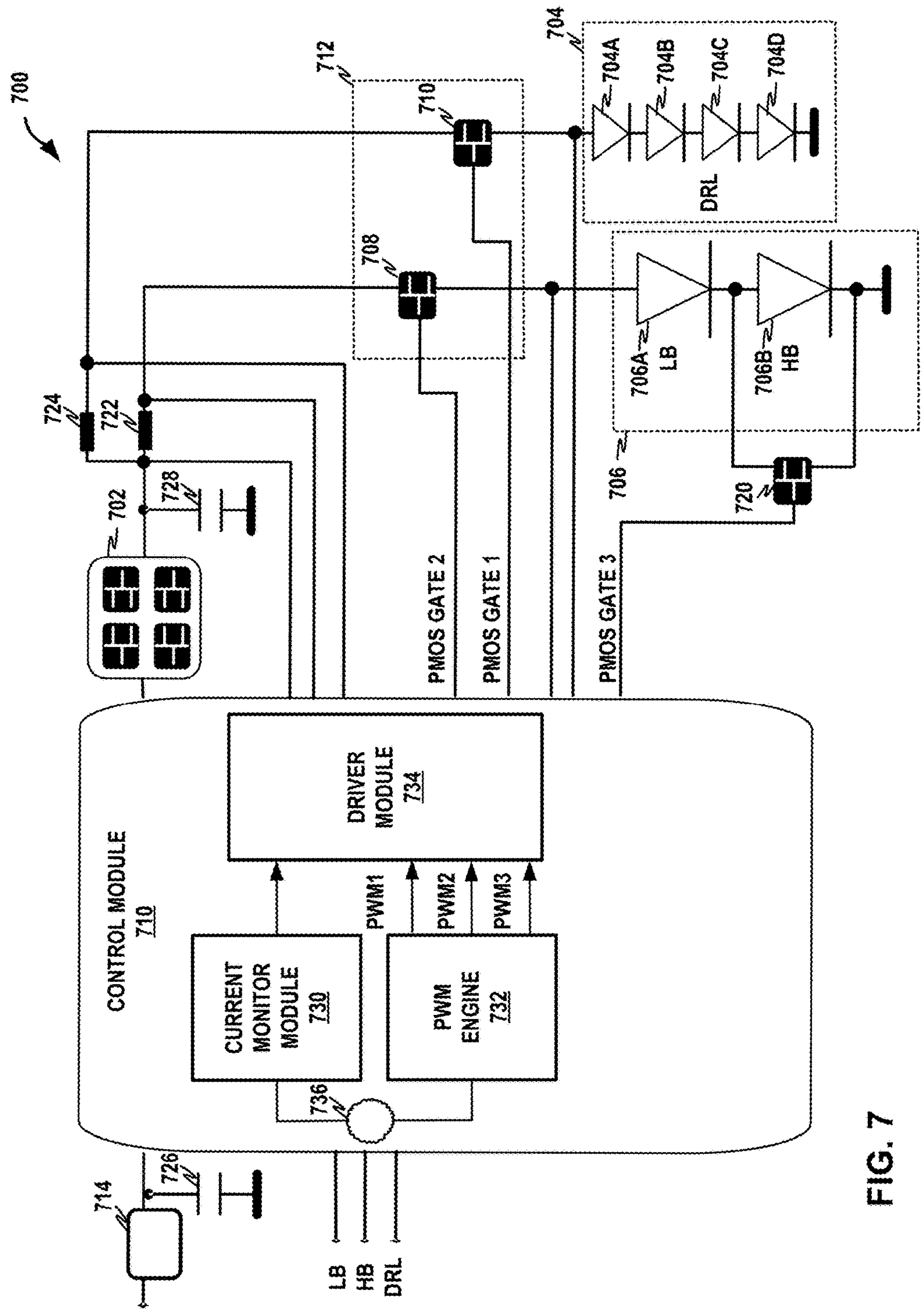
FIG. 7 is a conceptual diagram illustrating a second example circuit configured for mitigating a lack of output current when changing between a first set of LEDs and a second set of LEDs, in accordance with one or more techniques of this disclosure.

FIG. 7 is a conceptual diagram illustrating a second example circuit 700 configured for mitigating a lack of output current when changing between a first set of LEDs 704 and a second set of LEDs 706, in accordance with one or more techniques of this disclosure. As illustrated, circuit 700 includes power module 702, first set of LEDs 704, second set of LEDs 706, first branch switch 708 and second branch switch 710 (collectively, series module 712), control module 714, power source 716, bypass switch 720, sensing element 722, and capacitors 726 and 728, which may be similar to components of circuit 200. However, circuit 700 further includes sensing element 724.

In some examples, sensing element 722 may include a resistive element. As shown, sensing element 722 is coupled in series with first branch switch 708 and sensing element 724 is coupled in series with second branch switch 710. In the example of FIG. 7, there are two functions (e.g., activating first set of LEDs 704 and activating second set of LEDs 706) with different quantities of LEDs number. For instance, as indicated by the larger sized LEDs of second set of LEDs 706 compared to first set of LEDs 704, second set of LEDs 706 uses a higher power than first set of LEDs 704. In other examples, second set of LEDs 706 may use a lower power than first set of LEDs 704.

In contrast to circuit 200 of FIG. 2, in the example of FIG. 7, sensing elements 722 and 724 provide independent sensing paths. That is, current monitor module 730 may determine a current at first branch switch 708 using an indication (e.g., a proportional or stepped-down value) of a voltage at sensing element 722. Similarly, current monitor module 730 may determine a current at second branch switch 710 using an indication (e.g., a proportional or stepped-down value) of a voltage at sensing element 724. As such, current monitor module 730 may determine that the current at first branch switch 708 exceeds a current threshold when a current value indicated by the voltage at sensing element 722 exceeds the current threshold. Similarly, current monitor module 730 may determine that the current at second branch switch 710 exceeds a current threshold when a current value indicated by the voltage at sensing element 724 exceeds the current threshold. In this way, current monitor module 730 may provide feedback to close a control loop for operating first set of LEDs 704 and second set of LEDs 706.

As such, control module 714 may induce a jump up in power supplied by swapping a respective monitored path and at the same time to keep in conduction one branch until the other branch starts to conduct current. As previously discussed in FIGS. 5 and 6, PWM engine 732 may adjust the imposed first PWM signal and second PWM signal duty cycles in order to compensate the additional current on first set of LEDs 704.

Figure 8:
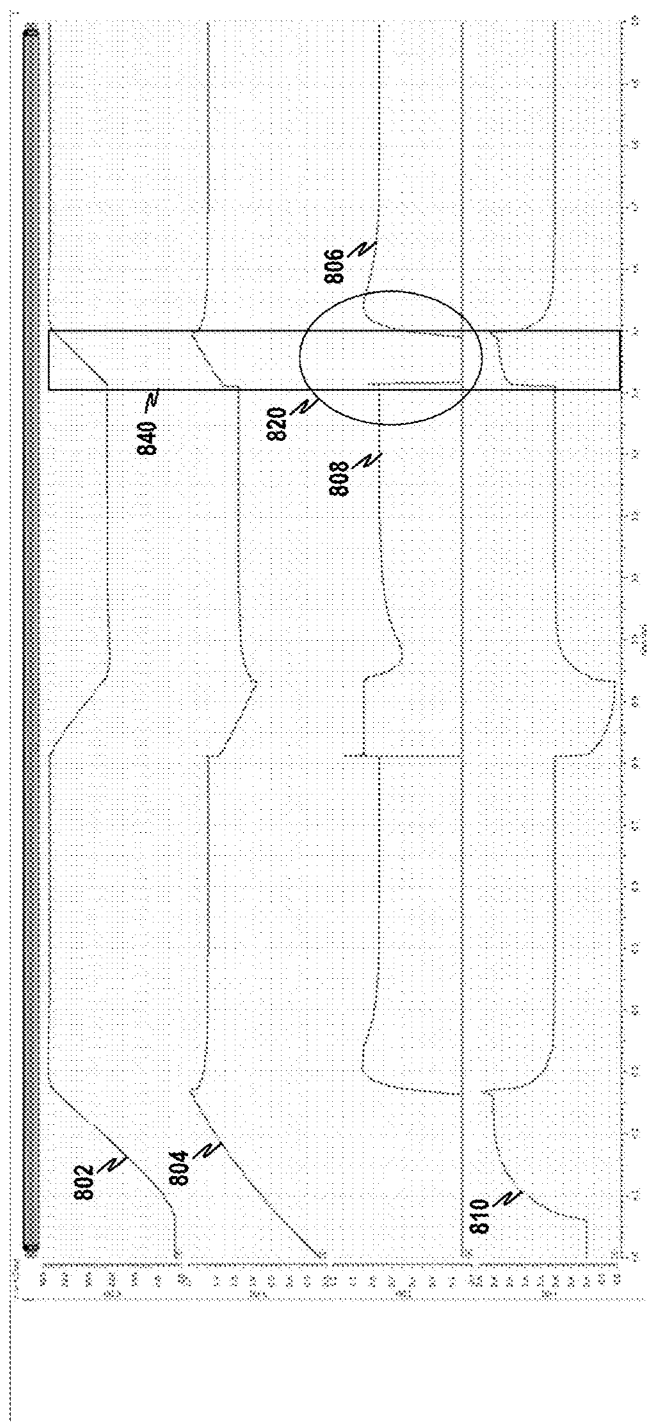
FIG. 8 is an illustration of a performance of a system that changes between a first set of LEDs and a second set of LEDs.

FIG. 8 is an illustration of a performance of a system that changes between a first set of LEDs and a second set of LEDs. For purposes of illustration only, FIG. 8 is described below within the context of system 100 of FIG. 1 and circuit 200 of FIG. 2. However, the techniques described below can be used in any permutation, and in any combination, with power module 102, first set of LEDs 104, second set of LEDs 106, first branch switch 108 and second branch switch 110 (collectively, series module 112), and control module 114. The abscissa axis (e.g., horizontal) of FIG. 8 represents time and the ordinate axis (e.g., vertical) of FIG. 8 represents an output voltage 802 at power module 202, a compensated voltage 804 at a compensation capacitor of control module 214, an output current 806 at first set of LEDs 204, an output current 808 at second set of LEDs 808, and an inductor current 810 of an inductor of power module 202.

In the example of FIG. 8, at time 840, logic module 236 raises compensated voltage 804, which drives output voltage 802 and inductor current 810. However, output voltage 802 is less than a forward voltage for activating first set of LEDs 204, which results in a lack of output current 820.

Figure 9:
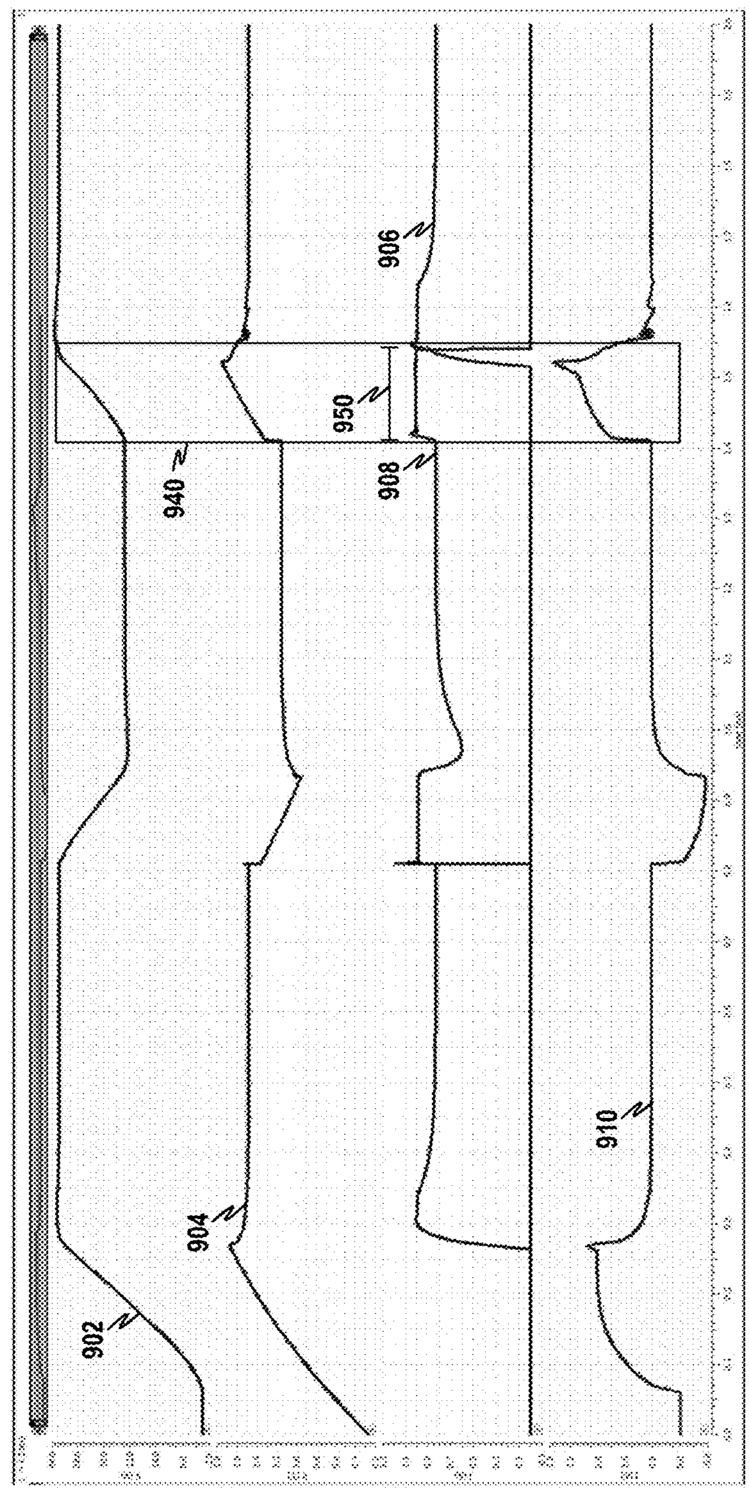
FIG. 9 is a first illustration of a performance of a system that mitigates a lack of output current when changing between a first set of LEDs and a second set of LEDs, in accordance with one or more techniques of this disclosure.

FIG. 9 is a first illustration of a performance of a system that mitigates a lack of output current when changing between a first set of LEDs and a second set of LEDs, in accordance with one or more techniques of this disclosure. For purposes of illustration only, FIG. 9 is described below within the context of system 100 of FIG. 1, circuit 200 of FIG. 2, and circuit 700 of FIG. 7. However, the techniques described below can be used in any permutation, and in any combination, with power module 102, first set of LEDs 104, second set of LEDs 106, first branch switch 108 and second branch switch 110 (collectively, series module 112), and control module 114. The abscissa axis (e.g., horizontal) of FIG. 9 represents time and the ordinate axis (e.g., vertical) of FIG. 9 represents an output voltage 902 at power module 702, a compensated voltage 904 at a compensation capacitor of control module 714, an output current 906 at first set of LEDs 704, an output current 908 at second set of LEDs 808, and an inductor current 910 of an inductor of power module 702.

In the example of FIG. 9, at time 940, logic module 736 raises compensated voltage 904, which drives output voltage 902 and inductor current 910. PWM engine 732 refrains from deactivating second branch switch 710 until a voltage at sensing element 722 indicates that output current 906 at first set of LEDs 704 exceeds a threshold current (e.g., 0.7 amperes), which helps to mitigate the lack of current illustrated in FIG. 8. In the example of FIG. 9, PWM engine 732 may determine time delay 950 corresponding between activating first branch switch 708 and deactivating second branch switch 710 based on a count value.

Figure 10:
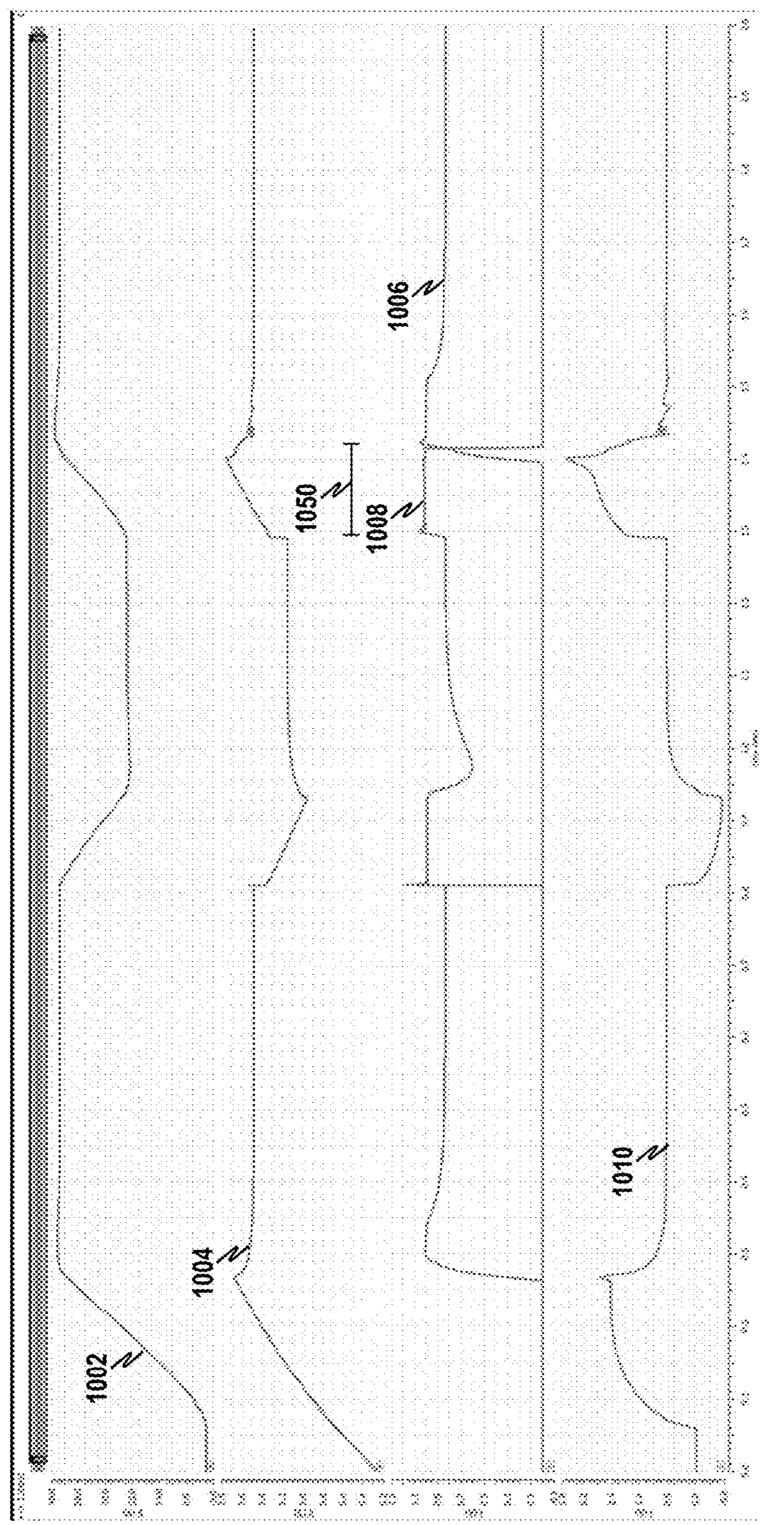
FIG. 10 is a second illustration of a performance of a system that mitigates a lack of output current when changing between a first set of LEDs and a second set of LEDs, in accordance with one or more techniques of this disclosure.

FIG. 10 is a second illustration of a performance of a system that mitigates a lack of output current when changing between a first set of LEDs and a second set of LEDs, in accordance with one or more techniques of this disclosure. For purposes of illustration only, FIG. 10 is described below within the context of system 100 of FIG. 1, circuit 200 of FIG. 2, and circuit 700 of FIG. 7. However, the techniques described below can be used in any permutation, and in any combination, with power module 102, first set of LEDs 104, second set of LEDs 106, first branch switch 108 and second branch switch 110 (collectively, series module 112), and control module 114. The abscissa axis (e.g., horizontal) of FIG. 10 represents time and the ordinate axis (e.g., vertical) of FIG. 10 represents an output voltage 1002 at power module 702, a compensated voltage 1004 at a compensation capacitor of control module 714, an output current 1006 at first set of LEDs 704, an output current 1008 at second set of LEDs 706, and an inductor current 1010 of an inductor of power module 702.

In the example of FIG. 10, PWM engine 732 may apply a same delay to the next turn-on PWM edge as a current turn-on PWM edge to account for an estimated time delay 1050 corresponding between activating first branch switch 708 and deactivating second branch switch 710. For example, PWM engine 232 may determine the estimated time delay to correspond to time delay 950 of FIG. 9. In this way, PWM engine 732 may accurately provide a target duty cycle while permitting the power module sufficient time to increase voltage.

Figure 11:
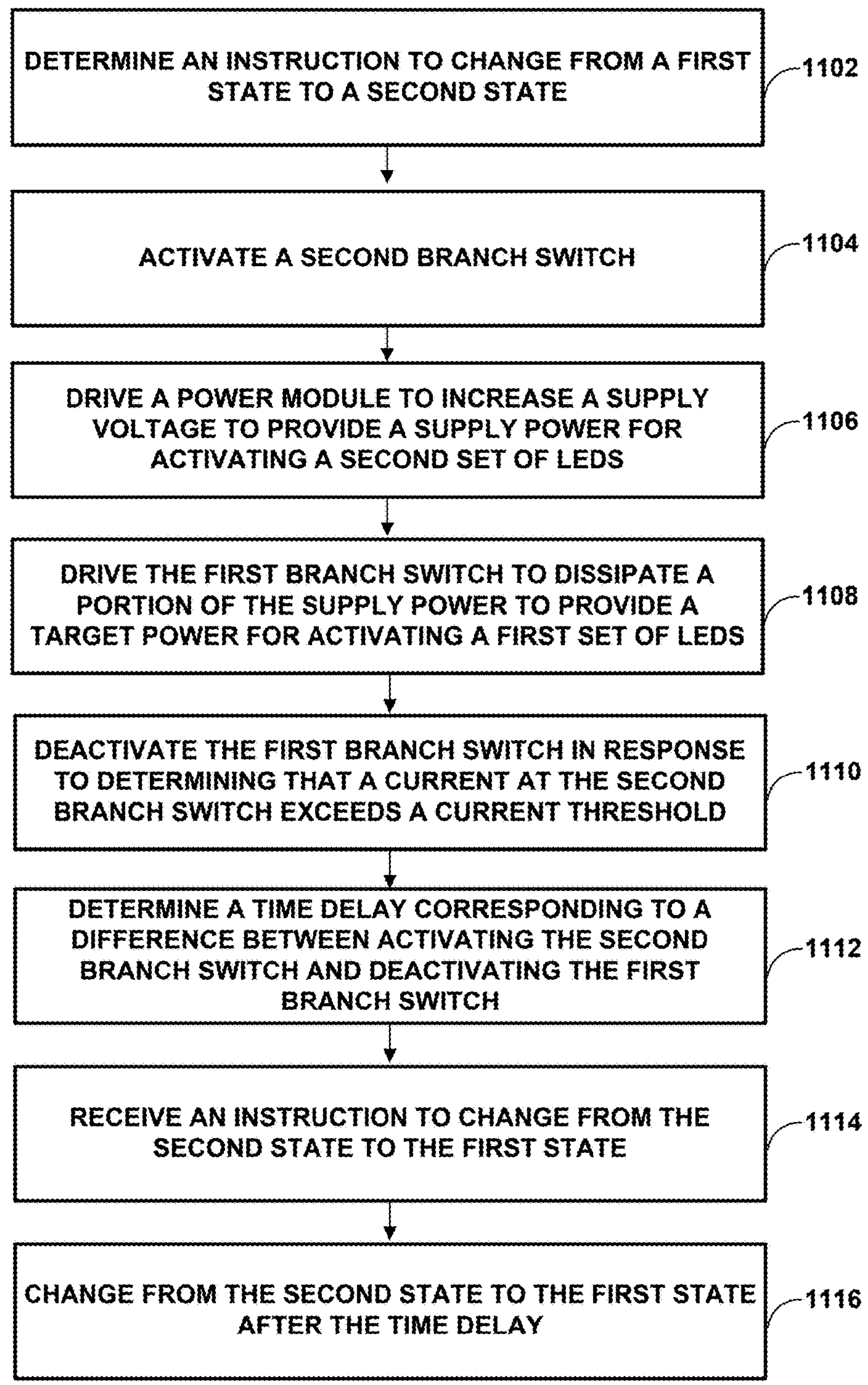
FIG. 11 is a flow diagram consistent with techniques that may be performed by the example system of FIG. 1, in accordance with this disclosure.

FIG. 11 is a flow diagram consistent with techniques that may be performed by the example system of FIG. 1, in accordance with this disclosure. For purposes of illustration only, FIG. 11 is described below within the context of system 100 of FIG. 1, circuit 200 of FIG. 2, and circuit 300 of FIG. 3. However, the techniques described below can be used in any permutation, and in any combination, with power module 102, first set of LEDs 104, second set of LEDs 106, first branch switch 108 and second branch switch 110 (collectively, series module 112), and control module 114.

In accordance with one or more techniques of this disclosure, PWM engine 232 determines an instruction to change from a first state to a second state (1102). For instance, PWM engine 232 receives the instruction to change from the first state to the second state. In some instances, PWM engine 232 generates the instruction to change from the first state to the second state. PWM engine 232 activates second branch switch 210 (1104). For example, PWM engine 232 may generate a second PWM signal to activate second set of LEDs 206. Logic module 236 may drive power module 202 to increase a supply voltage to provide a supply power for activating second set of LEDs 206 (1106). For example, logic module 236 may increase a compensation voltage at a compensation capacitor for power module 202.

Driver module 234 drives first branch switch 208 to dissipate a portion of the supply power to provide a target power for activating first set of LEDs 204 (1108). For example, driver module 234 modifies a resistance of first branch switch 208 to provide a target power for activating first set of LEDs 204. Driver module 234 deactivates first branch switch 208 in response to determining that a current at second branch switch 210 exceeds a current threshold (1110).

PWM engine 232 determines a time delay corresponding to a difference between activating second branch switch 210 and deactivating first branch switch 208 (1112). For example, PWM engine 232 determines a count value that is incremented each cycle between activating second branch switch 210 and deactivating first branch switch 208. PWM engine 232 receives an instruction to change from the second state to the first state (1114). PWM engine 232 changes from the second state to the first state after the time delay (1116).

The following examples may illustrate one or more aspects of the disclosure.

EXAMPLE 1

A method for regulating a current or power comprising: determining an instruction to change from a first state to a second state, wherein, during the first state, a first branch switch is activated to provide power to a first set of light emitting diodes (LEDs) and a second branch switch is deactivated to refrain from providing power to a second set of LEDs and wherein, during the second state, the first branch switch is deactivated to refrain from providing power to the first set of LEDs and the second branch switch is activated to provide power to the second set of LEDs; and in response to the instruction to change from the first state to the second state: driving a power module to activating the second branch switch; increase a supply voltage to provide a supply power for activating the second set of LEDs; driving the first branch switch to dissipate a portion of the supply power to provide a target power for activating the first set of LEDs in response to determining that a current at the second branch switch does not exceed a current threshold; and deactivating the first branch switch in response to determining that the current at the second branch switch exceeds the current threshold.

EXAMPLE 2

The method of example 1, wherein: driving the first switch to dissipate the first portion of the supply power comprises modifying a resistance of the first branch switch based on a difference between the first target power and the supply power.

EXAMPLE 3

The method of any combination of examples 1-2, further comprising: determining a time delay to change from the first state to the second state; and in response to an instruction to change from the second state to the first state: refraining from changing from the second state to the first state before the time delay; and changing from the second state to the first state after the time delay.

EXAMPLE 4

The method of any combination of examples 1-3, wherein determining the time delay comprises: incrementing, after activating the second branch switch and before deactivating the first branch switch, a count value.

EXAMPLE 5

The method of any combination of examples 1-4, wherein the second branch switch is coupled in series with a sensing element, the method comprising: determining the current at the second branch switch based on an indication of a voltage at the sensing element.

EXAMPLE 6

The method of any combination of examples 1-5, further comprising: determining that the current at the second branch switch exceeds the current threshold when a current value indicated by the voltage at the sensing element exceeds the current threshold.

EXAMPLE 7

The method of any combination of examples 1-6, wherein the sensing element is a second sensing element and wherein the first branch switch is coupled in series with a first sensing element.

EXAMPLE 8

The method of any combination of examples 1-7, wherein the first sensing element comprises a resistive element and wherein the second sensing element compresses a resistive element.

EXAMPLE 9

The method of any combination of examples 1-8, further comprising: receiving a first command pulse width modulated (PWM) signal to deactivate the first set of LEDs; and receiving a second command PWM signal to activate the second set of LEDs, wherein the first command signal and the second command signal indicate the instruction to change from a first state to a second state.\

EXAMPLE 10

The method of any combination of examples 1-9, wherein the first branch switch comprises a switching element.

EXAMPLE 11

A device for regulating a current or power comprising: a first branch switch configured to selectively provide power output by a power module to a first set of light emitting diodes (LEDs); a second branch switch configured to selectively provide power output by the power module to a second set of LEDs; and a control module configured to: determine an instruction to change from a first state to a second state, wherein, during the first state, the first branch switch is activated to provide power to the first set of LEDs and the second branch switch is deactivated to refrain from providing power to the second set of LEDs and wherein, during the second state, the first branch switch is deactivated to refrain from providing power to the first set of LEDs and the second branch switch is activated to provide power to the second set of LEDs; and in response to the instruction to change from the first state to the second state: drive the power module to activate the second branch switch; increase a supply voltage to provide a supply power for activating the second set of LEDs; drive the first branch switch to dissipate a portion of the supply power to provide a target power for activating the first set of LEDs in response to determining that a current at the second branch switch does not exceed a current threshold; and deactivate the first branch switch in response to determining that the current at the second branch switch exceeds the current threshold.

EXAMPLE 12

The device of example 11, wherein: to dissipate the first portion of the supply power, the first branch switch is configured to modify a resistance of the first branch switch.

EXAMPLE 13

The device of any combination of examples 11-12, wherein the control module is further configured to: determine a time delay corresponding to a difference between activating the second branch switch and deactivating the first branch switch; and in response to an instruction to change from the second state to the first state: refrain from changing from the second state to the first state before the time delay; and change from the second state to the first state after the time delay.

EXAMPLE 14

The device of any combination of examples 11-13, wherein, to determine the time delay, the control module is configured to: increment, after activating the second branch switch and before deactivating the first branch switch, a count value.

EXAMPLE 15

The device of any combination of examples 11-14, wherein the second branch switch is coupled in series with a sensing element, wherein control module is configured to: determine the current at the second branch switch based on an indication of a voltage at the sensing element.

EXAMPLE 16

The device of any combination of examples 11-15, wherein the control module is further configured to: determine that the current at the second branch switch exceeds the current threshold when a current value indicated by the voltage at the sensing element exceeds the current threshold.

EXAMPLE 17

The device of any combination of examples 11-16, wherein the sensing element is a second sensing element and wherein the first branch switch is coupled in series with a first sensing element.

EXAMPLE 18

The device of any combination of examples 11-17, wherein the first sensing element comprises a resistive element and wherein the second sensing element compresses a resistive element.

EXAMPLE 19

The device of any combination of examples 11-18, wherein the first branch switch comprises a switching element.

EXAMPLE 20

A system for regulating a current or power comprising: a power module configured to output power; a first set of light emitting diodes (LEDs); a second set of LEDs; a first branch switch configured to selectively provide at least a portion of the power output by the power module to the first set of LEDs; a second branch switch configured to selectively provide at least a portion of the power output by the power module to the second set of LEDs; and a control module configured to: determine an instruction to change from a first state to a second state, wherein, during the first state, the first branch switch is activated to provide power to the first set of LEDs and the second branch switch is deactivated to refrain from providing power to the second set of LEDs and wherein, during the second state, the first branch switch is deactivated to refrain from providing power to the first set of LEDs and the second branch switch is activated to provide power to the second set of LEDs; and in response to the instruction to change from the first state to the second state: activate the second branch switch; drive the power module to increase a supply voltage to provide a supply power for activating the second set of LEDs; drive the first branch switch to dissipate a portion of the supply power to provide a target power for activating the first set of LEDs when a current at the second branch switch does not exceed a current threshold; and deactivate the first branch switch when the current at the second branch switch exceeds the current threshold.

Various aspects have been described in this disclosure. These and other aspects are within the scope of the following claims.

The invention claimed is:

1. A method for regulating a current or power comprising: determining an instruction to change from a first state to a second state, wherein, during the first state, a first branch switch is activated to provide power to a first set of light emitting diodes (LEDs) and a second branch switch is deactivated to refrain from providing power to a second set of LEDs and wherein, during the second state, the first branch switch is deactivated to refrain from providing power to the first set of LEDs and the second branch switch is activated to provide power to the second set of LEDs; and in response to the instruction to change from the first state to the second state:

activating the second branch switch;

driving a power module to increase a supply voltage to provide a supply power for activating the second set of LEDs;

driving the first branch switch to dissipate a portion of the supply power to provide a target power for activating the first set of LEDs in response to determining that a current at the second branch switch does not exceed a current threshold; and deactivating the first branch switch in response to determining that the current at the second branch switch exceeds the current threshold.

2. The method according to claim 1, wherein:

driving the first switch to dissipate the first portion of the supply power comprises modifying a resistance of the first branch switch based on a difference between the first target power and the supply power.

3. The method according to claim 1, further comprising:

determining a time delay to change from the first state to the second state; and in response to an instruction to change from the second state to the first state:

refraining from changing from the second state to the first state before the time delay; and changing from the second state to the first state after the time delay.

4. The method according to claim 3, wherein determining the time delay comprises:

incrementing, after activating the second branch switch and before deactivating the first branch switch, a count value.

5. The method according to claim 1, wherein the second branch switch is coupled in series with a sensing element, the method comprising:

determining the current at the second branch switch based on an indication of a voltage at the sensing element.

6. The method according to claim 5, further comprising:

determining that the current at the second branch switch exceeds the current threshold when a current value indicated by the voltage at the sensing element exceeds the current threshold.

7. The method according to claim 5, wherein the sensing element is a second sensing element and wherein the first branch switch is coupled in series with a first sensing element.

8. The method according to claim 7, wherein the first sensing element comprises a resistive element and wherein the second sensing element compresses a resistive element.

9. The method according to claim 1, further comprising:

receiving a first command pulse width modulated (PWM) signal to deactivate the first set of LEDs; and receiving a second command PWM signal to activate the second set of LEDs, wherein the first command signal and the second command signal indicate the instruction to change from a first state to a second state.

10. The method according to claim 1, wherein the first branch switch comprises a switching element.

11. A device for regulating a current or power comprising:

a first branch switch configured to selectively provide power output by a power module to a first set of light emitting diodes (LEDs);

a second branch switch configured to selectively provide power output by the power module to a second set of LEDs; and a control module configured to:

determine an instruction to change from a first state to a second state, wherein, during the first state, the first branch switch is activated to provide power to the first set of LEDs and the second branch switch is deactivated to refrain from providing power to the second set of LEDs and wherein, during the second state, the first branch switch is deactivated to refrain from providing power to the first set of LEDs and the second branch switch is activated to provide power to the second set of LEDs; and in response to the instruction to change from the first state to the second state:

activate the second branch switch;

drive the power module to increase a supply voltage to provide a supply power for activating the second set of LEDs;

drive the first branch switch to dissipate a portion of the supply power to provide a target power for activating the first set of LEDs in response to determining that a current at the second branch switch does not exceed a current threshold; and deactivate the first branch switch in response to determining that the current at the second branch switch exceeds the current threshold.

12. The device according to claim 11, wherein:

to dissipate the first portion of the supply power, the first branch switch is configured to modify a resistance of the first branch switch.

13. The device according to claim 11, wherein the control module is further configured to:

determine a time delay corresponding to a difference between activating the second branch switch and deactivating the first branch switch; and in response to an instruction to change from the second state to the first state:

refrain from changing from the second state to the first state before the time delay; and change from the second state to the first state after the time delay.

14. The device according to claim 11, wherein, to determine the time delay, the control module is configured to:

increment, after activating the second branch switch and before deactivating the first branch switch, a count value.

15. The device according to claim 11, wherein the second branch switch is coupled in series with a sensing element, wherein control module is configured to:

determine the current at the second branch switch based on an indication of a voltage at the sensing element.

16. The device according to claim 15, wherein the control module is further configured to:

determine that the current at the second branch switch exceeds the current threshold when a current value indicated by the voltage at the sensing element exceeds the current threshold.

17. The device according to claim 15, wherein the sensing element is a second sensing element and wherein the first branch switch is coupled in series with a first sensing element.

18. The device according to claim 17, wherein the first sensing element comprises a resistive element and wherein the second sensing element compresses a resistive element.

19. The device according to claim 11, wherein the first branch switch comprises a switching element.

20. A system for regulating a current or power comprising:

a power module configured to output power;

a first set of light emitting diodes (LEDs);

a second set of LEDs;

a first branch switch configured to selectively provide at least a portion of the power output by the power module to the first set of LEDs;

a second branch switch configured to selectively provide at least a portion of the power output by the power module to the second set of LEDs; and a control module configured to:

determine an instruction to change from a first state to a second state, wherein, during the first state, the first branch switch is activated to provide power to the first set of LEDs and the second branch switch is deactivated to refrain from providing power to the second set of LEDs and wherein, during the second state, the first branch switch is deactivated to refrain from providing power to the first set of LEDs and the second branch switch is activated to provide power to the second set of LEDs; and in response to the instruction to change from the first state to the second state:

activate the second branch switch;

drive the power module to increase a supply voltage to provide a supply power for activating the second set of LEDs;

drive the first branch switch to dissipate a portion of the supply power to provide a target power for activating the first set of LEDs when a current at the second branch switch does not exceed a current threshold; and deactivate the first branch switch when the current at the second branch switch exceeds the current threshold.

* * * * *